July 19, 1949.  G. J. LEXA  2,476,882
CYCLIC ELECTRIC WELDER AND THE LIKE
Filed April 19, 1947
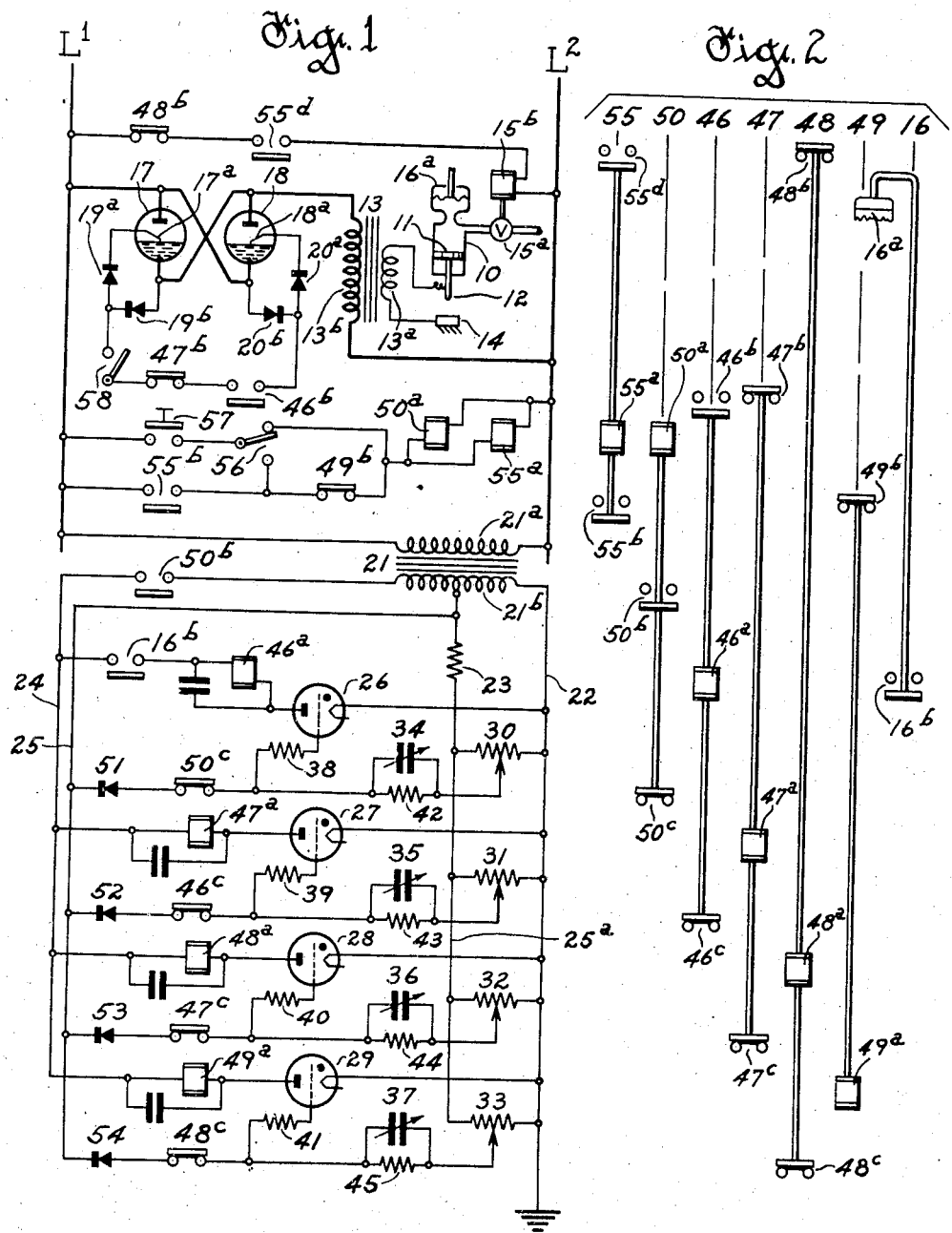
Inventor
George J. Lexa
By
Attorney Patented July 19, 1949

2,476,882

UNITED STATES PATENT OFFICE 2,476,882

CYCLIC ELECTRIC WELDER AND THE LIKE

George J. Lexa, Wauwatosa, Wis., assignor to Cutler-Hammer, Inc., Milwaukee, Wis., a corporation of Delaware Application April 19, 1947, Serial No. 742,639

6 Claims. (Cl. 315—269)

The invention relates to a cycle controller and while not limited thereto is particularly applicable to electric resistance welding systems.

In resistance welding systems the parts which are to be welded together are connected into an electric circuit by means of a pair of electrodes which complete the circuit by pressing the parts together. Thereafter the circuit is energized, the current passing between the parts heating their points of contact and causing them to weld. In order to make a satisfactory weld it is necessary that the contact pressure between the parts be accurately regulated, that the total energy supplied to heat the contact be accurately measured and that after current interruption the parts be held under pressure for a sufficient time to allow the molten metal to solidify, whereupon the pressure may be released and the system readied for another weld by separation of the welding electrodes.

In some cases it is sufficient to supply a single welding impulse to an area on the workpiece which is to be welded, while in other cases it is desirable to supply in succession a number of welding impulses to the same area. In either case it is necessary to accurately control the aforementioned steps of each cycle.

An object of the present invention is to provide a welding controller which permits accurate independent adjustment of the various intervals of a welding cycle.

Another object is to provide a timing circuit which is independent of the past history of an electron tube forming an element of the circuit.

Another object is to provide a timing circuit which compensates automatically for variations of the supply voltage.

Another object is to provide a timing circuit which is suitable for either high vacuum or gaseous tubes.

Another object is to provide a timing circuit whose control voltage comprises a constant amplitude D. C. component and a variable amplitude A. C. component, resulting in great accuracy of timing.

Another object is to provide a controller which delays the supply of welding energy for a sufficient time to assure that the pressure exerted on the work by the welding jaws has reached the required value.

Other objects and advantages will hereinafter appear.

The accompanying drawing shows a system embodying the invention. In the drawing, Fig. 1 is a connection diagram of the various parts, while Fig. 2 shows in a well known manner the relationship of the energizing coils and the corresponding contacts of electromagnetic relays and other devices employed in the system illustrated by Fig. 1.

Referring to the drawing, a hydraulic welding machine is represented by a cylinder 10 having a piston 11, to which is attached one electrode 12 connected to one terminal of a secondary winding 13a of a welding transformer 13 having a primary winding 13b. The second terminal of the winding 13a is connected to a stationary anvil or electrode 14 of the welding machine. The parts to be welded together are introduced between the jaws 12 and 14 so that when the jaws are pressed together and the transformer 13 is energized, welding current passes between the jaws and through the parts to be welded to heat the parts to welding temperature.

The cylinder 10 is supplied with actuating pressure fluid from any convenient source through a normally closed valve 15a having an electromagnetic operating winding 15b, which when energized opens the valve 15a to admit pressure fluid to the cylinder 10. The pressure cylinder is also provided with a pressure responsive diaphragm 16a, which as indicated in Fig. 2 is an operating medium for a switch 16. The winding 15b is supplied with energy from alternating current bus bars $L^1$, $L^2$, in a manner which will be described hereinafter.

Connected between the lines $L^1$, $L^2$, and in series with transformer winding 13b in inverse parallel with each other are the ignitrons 17 and 18. The ignition electrode 18a of ignitron 18 is connected through two half wave rectifiers 20a and 20b to the anode of ignitron 17 and the ignition electrode 17a of ignitron 17 is similarly connected through two half wave rectifiers 19a and 19b to the anode of ignitron 18. There is also connected across lines $L^1$, $L^2$, a primary winding 21a of a transformer 21, which has a secondary winding 21b provided with an intermediate current tap. One end terminal of the winding 21b is connected to a bus bar 22. The intermediate tap is connected through a resistor 23 to a bus bar 25a, while the other end terminal of the winding 21b is connected through normally disengaged contacts 50b to a bus bar 24. The intermediate tap of the winding 21b is also connected directly to a bus bar 25. Connected to the bus bar 22 are the cathodes of gaseous tubes 26, 27, 28 and 29, respectively.

Connected in parallel with each other across the bus bars 22 and 25a are potentiometer resistors 30, 31, 32 and 33. The movable contacts of these potentiometers are connected through capacitors 34, 35, 36 and 37, respectively, to the control electrodes of the tubes 26, 27, 28 and 29. Interposed between the respective capacitors and the corresponding control electrodes are the current limiting resistors 38, 39, 40 and 41, respectively, while the capacitors are paralleled by discharge resistors 42, 43, 44 and 45, respectively. The anodes of the tubes 26, 27, 28 and 29 are connected respectively to electromagnetic windings 46a, 47a, 48a and 49a, which windings as indicated in Fig. 2 are for electromagnetic switches 46, 47, 48 and 49, respectively. Each of the windings 46a, 47a, 48a and 49a is preferably paralleled by a smoothing capacitor. The other terminal of the winding 46a is connected through the contacts 16b, to the bus bar 24, while the other terminals of the windings 47a, 48a and 49a are directly connected to the bus bar 24. The common point of the resistors 38 and 42 is connected through normally engaged contacts 50c and half wave rectifier 51 to bus bar 25, said rectifier permitting current flow only towards the bus bar 25. Contacts 50c as indicated by Fig. 2 are contacts of an electromagnetic relay 50. The common point of the resistors 43 and 39 is connected through normally engaged contacts 46c of electromagnetic relay 46 to and through a rectifier 52 to the bus bar 25. The common point of the resistors 40 and 44 is connected through normally engaged contacts 47c of electromagnetic relay 47, to and through a rectifier 53, to the bus bar 25 and the common point of the resistors 41 and 45 is connected through normally engaged contacts 48c of electromagnetic relay 48, to and through a rectifier 54 to the bus bar 25. The rectifiers 52, 53 and 54 are half wave rectifiers which like rectifier 51 permit current flow only toward bus bar 25.

Connected in parallel between the lines L¹, L², through normally disengaged contacts 55b and normally engaged contact 49b are electromagnetic windings 50a and 55a which as indicated in Fig. 2 are windings of electromagnetic relays 50 and 55 respectively. A double throw single pole switch 56 when thrown in one direction connects a normally open push button switch 57 in parallel with the series connected contacts 55b and 49b, while said switch 56 when thrown in the other direction connects push button switch 57 in parallel with the contact 55b only. The electromagnetic switch 48 is provided with normally engaged contacts 48b which are connected in series with normally disengaged contacts 55d of relay 55 and with winding 15b across bus bars L¹, L². Connected between the cathodes of the tubes 17 and 18 in series relation are normally disengaged contacts 46b of relay 46 and normally engaged contacts 47b of relay 47 and a manual switch 58.

The operation of the system thus far described is as follows: If it is desired to make a weld with a single current impulse the switch 58 is closed and switch 56 is moved to the position shown in the drawing. As the transformer 21 is energized the bus bars 22 and 25 are also energized, and as the contacts 50c, 46c, 47c and 48c are closed, the condensers 34 to 37, inclusive, are charged to a high potential which causes the control electrodes of the tubes 26 to 29, inclusive, to be negative with respect to their cathodes, thus blocking current conduction by the respective tubes during the positive half cycles of the voltage impressed upon said tubes.

The operator now closes momentarily the push button switch 57 thereby energizing relay coils 50a and 55a. Energization of relay 55 engages contacts 55b, thereby establishing a maintaining circuit for the coils 50a and 55a, which passes through the normally engaged contacts 49b and parallels the push button switch 57 and switch 56. Energization of relay 55 also engages contacts 55d, thereby completing the energizing circuit for the winding 15b, which causes opening of the valve 15a to admit pressure fluid to the cylinder 10. The piston 11 is moved downwardly to bring the electrodes 12 and 14 together and to exert pressure on the material pressed therebetween which closes the circuit for the welding coil 13a. As the pressure in the cylinder rises the pressure switch 16 closes the contacts 16b. This completes connections for the winding 46, but said winding is not energized due to the negative potential on the control electrode of tube 26. However, the contacts 50c are disengaged at the moment of energization of the relay 50 so that now the charging circuit for the capacitor 34 is interrupted and the latter discharges through the resistor 42 until finally the negative voltage impressed upon the control electrode of the tube 26 is sufficiently reduced to permit conduction of said tube.

It should be noted here that the voltage which is impressed upon the control electrode of tube 26 consists of the unidirectional voltage impressed thereupon by the capacitor on which is superposed an alternating potential derived from the potentiometer resistor 30. As a result the rate of change of the control electrode voltage at the moment it passes through the critical voltage value at which the tube becomes conducting is relatively high even though the rate of change of the capacitor voltage is low, thus affording a very precise control of the moment during the half cycle when the tube 26 becomes conducting. The same observation also holds true for the operation of the tubes 27 to 29, inclusive.

It will be further noted that in case the contacts 50b should be engaged and the contacts 50c disengaged prior to engagement of contacts 16b, the tube 26 is prevented from conducting due to the interruption of its circuit by the contacts 16b. This assures that the timing by the tube 26 does not start until sufficient pressure is developed between the electrodes 12 and 14. As soon as relay 46 is energized it engages the normally disengaged contacts 46b and disengages the normally engaged contacts 46c. Engagement of contacts 46b completes a circuit from line L¹, through half wave rectifier 20b, contact 46b and normally closed contact 47b, switch 58, half wave rectifier 19a to the ignition electrode 17a through the cathode of tube 17 and through the transformer winding 13b, to line L² and alternately from line L² through transformer winding 13b, half wave rectifier 19b, switch 58, contacts 47b and 46b, half wave rectifier 20a to electrode 18a of tube 18 so that the tubes 17 and 18 become alternately conducting during their respective half cycles to energize the transformer 13 for supply of welding current to the welding electrodes 12 and 14, through the transformer winding 13a.

Opening of the contact 46c disconnects the capacitor 35 from the bus bar 25 and permits the same to discharge until the negative potential of the tube 27 becomes sufficiently low to permit conduction of the tube 27. This energizes the winding of relay 47 which thereupon opens the normally closed contact 47b and the normally closed contact 47c. Opening of contact 47b interrupts the circuit which supplies energy to the ignition electrodes 17a and 18a, so that the conduction of the tubes 17 and 18 and supply of welding current to the welding jaws 12 and 14 is interrupted. Opening of the contact 47c permits conduction of the tube 28 after a time delay determined by the discharge of the capacitor 36 in the manner aforedescribed, whereupon the tube 28 becomes conducting thus energizing the relay coil 48a which opens the normally closed contacts 48b and 48c. Opening of contact 48b interrupts supply of pressure fluid to the cylinder 10 so that pressure between the jaws 12 and 14 upon the weld is released. Opening of contact 48c affords discharge of the capacitor 37 and after a certain time has elapsed the tube 29 becomes conducting thereby energizing relay 49, which causes opening of the contact 49b to deenergize relay windings 50a and 55a and returns the system to the condition prevailing at the start of the cycle just described. Should the push button switch 57 be held depressed during and after the entire cycle described, the relays 50 and 55 would not be deenergized upon operation of relay 49. In that event contact 50b would remain closed at the end of the cycle, maintaining energization of relays 46, 47, 48 and 49, so that there would not be any pressure on the welding jaws 12 and 14 due to continued disengagement of contacts 48b.

If it should be desired to test the cycle of the equipment without supplying welding current it is only necessary to open the switch 58 thereby interrupting the supply of energy to the ignition electrodes 17a and 18a, but in all other respects the system functions as aforedescribed.

Should it be desired to repeat the welding cycle periodically as long as the push button switch 57 is depressed, the switch 56 is moved to its lowermost position. Upon initial closure of the push button switch the circuit operates as aforedescribed, except that opening of the normally open maintaining contact 55b of relay 55 is now inoperative to terminate operation at the end of an individual cycle so that the cycle is repeated until the push button 57 is released.

What I claim as new and desire to secure by Letters Patent is:

1. The combination with a plurality of electro-responsive windings to be energized progressively subject to predetermined timing and an alternating current supply source, of like but separate and independently adjustable timing circuits for said windings, each comprising a grid type electron tube, a resistor and capacitor in parallel and a rectifier, and each also comprising connections between a grid of said tube and said source to render the tube conducting in response to alternate half cycles of voltage of said source and connections to supply its capacitor from said source through its rectifier to superimpose a unidirectional voltage on the alternating voltage impressed upon its grid, thereby to block conduction by the tube, and means to control the latter connections of the several circuits for unblocking their tubes progressively in the desired order of response of said windings, the capacitor of each circuit when relieved of the impressed unidirectional potential gradually discharging to permit its respective tube to be rendered conducting.

2. The combination with a plurality of electro-responsive windings to be energized progressively subject to predetermined timing and an alternating current supply source, of like but separate and independently adjustable timing circuits for said windings, each comprising a grid type electron tube having its main path connected in series with the respective winding, a resistor and capacitor in parallel and a rectifier, and each also comprising connections between a grid of said tube and said source to render the tube conducting in response to alternate half cycles of voltage of said source and connections to supply its capacitor from said source through its rectifier to superimpose a unidirectional voltage on the alternating voltage impressed upon its grid, thereby to block conduction by the tube, each capacitor when relieved of such unidirectional voltage gradually discharging to permit its respective tube to become conducting, and means to control said timing circuits to so relieve their capacitors progressively in the desired order of response of said windings, the last mentioned means comprising switches individualized to different timing circuits and operable by certain of said windings respectively.

3. The combination with a plurality of electro-responsive windings to be energized progressively subject to predetermined timing and an alternating current supply source, of like but separate and independently adjustable timing circuits for said windings, each comprising a grid type electron tube having its main path connected in series circuit with the respective winding, means to connect said several series circuits in parallel with each other to said source, a resistor and capacitor in parallel and a rectifier, and each also comprising connections between a grid of said tube and said source to render the tube conducting in response to alternate half cycles of voltage of said source and connections to supply its capacitor from said source through its rectifier to superimpose a unidirectional voltage on the alternating voltage impressed upon its grid, thereby to block conduction by the tube, and switches, each responsive to energization of one of said windings and each controlling one of said timing circuits to relieve its respective capacitor of the unidirectional voltage to which it is subject, each such capacitor when relieved of the impressed unidirectional voltage gradually discharging to permit its respective tube to become conducting.

4. The combination with a plurality of electro-responsive windings to be energized progressively subject to predetermined timing and an alternating current supply source, of like but separate and independently adjustable timing circuits for said windings, each comprising a grid type electron tube, having its main path connected in series circuit with the respective winding, means to connect said several series circuits in parallel with each other to said source, a resistor and capacitor in parallel and a rectifier, and each also comprising connections between a grid of said tube and said source to render the tube conducting in response to alternate half cycles of voltage of said source and connections to supply its capacitor from said source through its rectifier to superimpose a unidirectional voltage on the alternating voltage impressed upon its grid, thereby to block conduction by the tube and switches individualized to said timing circuits for progressively relieving the capacitors of the latter of the unidirectional superposed voltage to permit the respective tubes to become conducting progressively subject to gradual discharge of the respective capacitors, one of said switches requiring operation by means other than said windings but the remainder of said switches being operable by said windings respectively.

5. The combination with a plurality of electro-responsive windings to be energized progressively subject to predetermined timing and an alternating current supply source of like but separate and independently adjustable timing circuits for said windings, each comprising a grid type electron tube having its main path connected in series with the respective winding, a resistor and capacitor in parallel and a rectifier and each also comprising a potentiometer connected to said source and connections between a grid of said tube and an adjustable tap of said potentiometer tending to render the tube conducting for an adjustable portion of alternate half cycles of voltage of said source and connections to supply its capacitor from said source through its rectifier and its potentiometer to superimpose a unidirectional voltage on the alternating voltage impressed upon its grid, thereby to block conduction by the tube, and means to control said timing circuits for unblocking their tubes progressively in the desired order of response of said windings, each such capacitor when relieved of the impressed unidirectional potential gradually discharging to permit its respective tube to be rendered conducting as aforestated.

6. The combination with a plurality of electro-responsive windings to be energized progressively subject to predetermined timing and an alternating current supply source, of like but separate and independently adjustable timing circuits for said windings, each comprising a grid type electron tube, having its main path connected in series circuit with the respective winding, means to connect said several series circuits in parallel with each other to said source, a resistor and capacitor in parallel and a rectifier, and each also comprising connections between a grid of said tube and said source to render the tube conducting in response to alternate half cycles of voltage of said source and connections to supply its capacitor from said source through its rectifier to superimpose a unidirectional voltage on the alternating voltage impressed upon its grid, thereby to block conduction by the tube, switches, each responsive to energization of one of said windings and each controlling one of said timing circuits for unblocking the respective tube, thus to effect unblocking of said tubes progressively in the desired order of response of said windings, each such capacitor when relieved of the impressed unidirectional potential gradually discharging to permit its respective tube to be rendered conducting as aforestated, and means to render automatic or non-automatic selectively repetition of a given cycle of response of said windings.

GEORGE J. LEXA.

REFERENCES CITED

The following references are of record in the file of this patent:

UNITED STATES PATENTS

| Number | Name | Date |
| --- | --- | --- |
| Re. 19,896 | Alexanderson | Mar. 24, 1936 |
| 1,939,462 | Ramsay | Dec. 12, 1933 |
| 1,988,274 | Glaser | Jan. 15, 1935 |
| 2,337,905 | Livingston | Dec. 28, 1943 |